(12) United States Patent
Hørlyck

(10) Patent No.: US 6,285,480 B1
(45) Date of Patent: Sep. 4, 2001

(54) METHOD AND AN AMPLIFIER UNIT FOR THE TRANSMISSION OF DATA SIGNALS VIA AN OPTICAL FIBER

(75) Inventor: Henrik Hørlyck, Charlottenlund (DK)

(73) Assignee: DSC Communications A/S, Ballerup (DK)

( * ) Notice: Subject to any disclaimer, the term of this patent is extended or adjusted under 35 U.S.C. 154(b) by 0 days.

(21) Appl. No.: 09/194,788
(22) PCT Filed: May 30, 1997
(86) PCT No.: PCT/DK97/00240
§ 371 Date: Aug. 13, 1999
§ 102(e) Date: Aug. 13, 1999
(87) PCT Pub. No.: WO97/47100
PCT Pub. Date: Dec. 11, 1997

(30) Foreign Application Priority Data

May 31, 1996 (DK) .................................................. 0619/96

(51) Int. Cl.⁷ .................................................. H04B 10/02
(52) U.S. Cl. ............................................. 359/134; 359/177
(58) Field of Search .................................. 359/135, 136, 359/110, 179, 184, 160, 177, 134

(56) References Cited

U.S. PATENT DOCUMENTS

| | | | |
|---|---|---|---|
| 5,383,046 | 1/1995 | Tomofuji et al. | 359/176 |
| 5,440,418 * | 8/1995 | Ishimura et al. | 359/177 |
| 5,535,037 * | 7/1996 | Yoneyama | 359/177 |
| 5,737,118 * | 4/1998 | Sugaya et al. | 359/341 |
| 5,784,192 * | 7/1998 | Sugiyama et al. | 359/341 |
| 5,905,585 * | 5/1999 | Shirai | 359/110 |

FOREIGN PATENT DOCUMENTS 2712096  5/1995  (FR) ............................... G02F/1/035

* cited by examiner

*Primary Examiner*—Leslie Pascal
*Assistant Examiner*—Dalzid Singh
(74) *Attorney, Agent, or Firm*—Baker Botts L.L.P.

(57) ABSTRACT

A method of transmitting data signals via an optical fiber between two network elements (14, 36; 43, 56) in a digital data transmission network comprises using a transmission protocol, wherein, in addition to said data signals, first control and/or monitor signals in the form of overhead signals are transmitted. An optical fiber amplifier (23) is inserted in the optical fiber between the is two network elements. Additionally, second control and/or monitor signals in a format corresponding to said overhead signals are transferred between the optical fiber amplifier and at least one of the two network elements.

Figure 1:
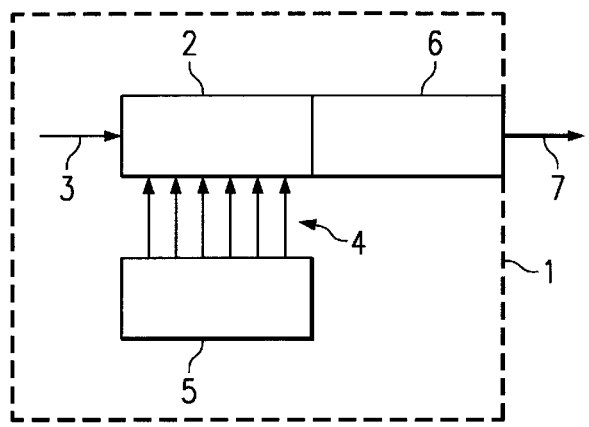

An amplifier unit (22; 48) comprising an optical fiber amplifier (23) is adapted to be inserted in an optical fiber for the transmission of data signals between two network elements (14, 36; 43, 56) in such a data transmission network. The unit moreover comprises means to transfer second control and/or monitor signals in a format corresponding to said overhead signals between the unit and at least one of the two network elements.

19 Claims, 3 Drawing Sheets

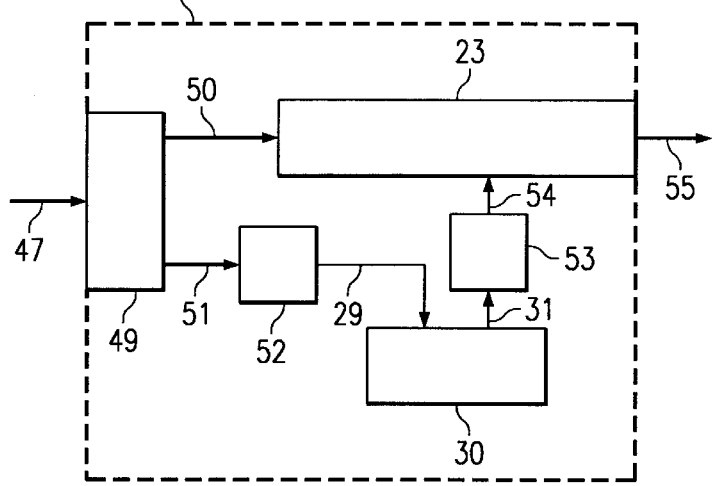
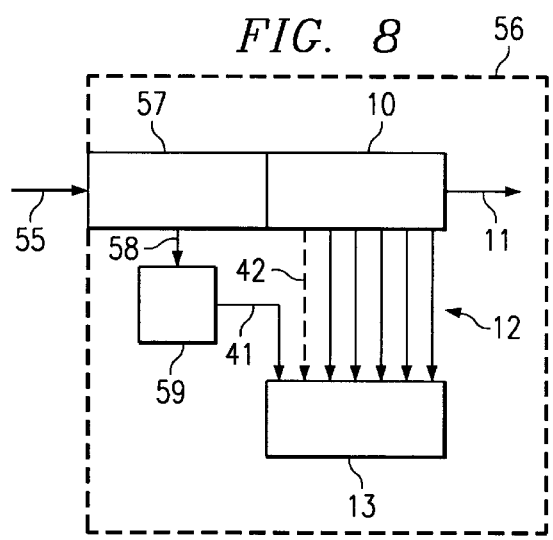
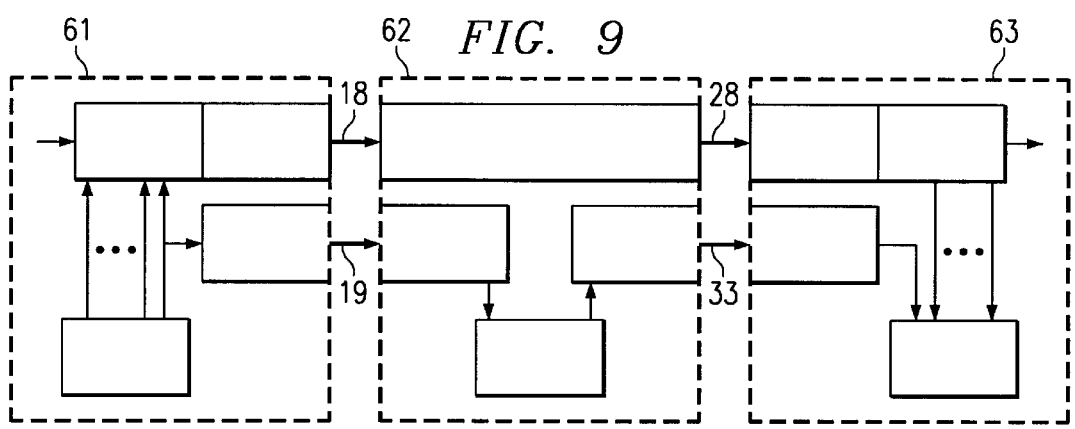

METHOD AND AN AMPLIFIER UNIT FOR THE TRANSMISSION OF DATA SIGNALS VIA AN OPTICAL FIBER

The invention concerns a method of transmitting data signals via an optical fibre between two network elements in a digital data transmission network, wherein, in addition to said data signals, first control and/or monitor signals are transmitted for the administration of the network, and wherein an optical fibre amplifier is inserted in the optical fibre between the two network elements. The invention moreover concerns an amplifier unit for use in such a data transmission network.

Today, optical fibres are extensively used in teletransmission networks. However, a drawback is that attenuation puts a limit to the length of the fibres that can be used. This circumstance has been improved considerably by the development of optical fibre amplifiers, which are purely optical components that are introduced into a fibre and perform optical amplification of the light which passes it. Very long fibre lengths can be obtained hereby, as fibre amplifiers so to speak replace traditional electrical regenerators or repeaters.

Traditional regenerators in a transmission network, i. e. regenerators where the optical signals are converted into electrical signals, are amplified and converted again into optical signals, are usually monitored by transferring a plurality of monitoring signals between each regenerator and its adjacent network elements in the network. Owing to operational reliability it is desired to monitor the optical fibre amplifiers for same reason in the same manner.

However, in most transmission systems, such as e.g. SDH or SONET, the monitoring signals are transferred in so-called overhead bytes which are embedded among the other data in the data blocks of the transmission protocols. The signals are therefore accessible only when the data blocks "are packed out", as is done—or at any rate may be done—in the traditional electrical regenerators. This, however, is not possible in an optical fibre amplifier, since this merely optically amplifies the light passing it and therefore has no access to individual bytes in the data flow.

Systems are known wherein separate and special monitoring signals can be transmitted via the fibre or in another manner to or from such optical fibre amplifiers. However, these special signals require special equipment at the fibre amplifiers as well as at the adjacent network elements. Further, these signals cannot readily be incorporated in the general monitoring system of the network, which, as mentioned, can take place e.g. by means of the overhead bytes of the transmission system, and the monitoring of the optical fibre amplifiers will therefore be rather complex.

FR 2 712 096 discloses a system in which control signals can be modulated to the output signal of an optical amplifier. However, monitoring signals proper are not involved.

A system of the type described above with separate and special monitoring signals via the fibre is disclosed in U.S. Pat. No. 5,383,046. The monitoring signals are amplitude modulated on the data signals passing the fibre amplifier. Nor do these signals have a format allowing them to be incorporated in the general monitoring system of the network, because they are transmitted as special signals to the subsequent regenerator proper and only then incorporated into the SDH system.

Accordingly, an object of the invention is to provide a method and an amplifier unit enabling relatively simple monitoring of such fibre amplifiers, and allowing said monitoring to be incorporated directly in the general monitoring system of the network.

This is achieved according to the invention by a method wherein said control and/or monitor signals are transferred between the optical fibre amplifier and at least one of the two network elements in a format corresponding to said overhead signals.

When signals of this format are transferred to or from the fibre amplifier, these signals in the adjacent network elements may be directly incorporated in the general monitoring system, and it will therefore be possible to monitor the fibre amplifiers in quite the same manner as if it had been traditional electrical regenerators.

It will be expedient that said second control and/or monitor signals are transferred, as stated in claim 2, between the optical fibre amplifier and said network element via an optical fibre, and preferably, as stated in claim 3, via the optical fibre in which the optical fibre amplifier is inserted.

If, like in claim 4, said second control and/or monitor signals are transferred without changing said data signals and first control and/or monitor signals, a system is provided wherein the overall monitoring system has access to all signals as they were before the insertion of the fibre amplifier.

An expedient embodiment is achieved when, as stated in claim 5, said second control and/or monitor signals are transferred by means of special optical transmitter/receiver units placed at the optical line amplifier and said network element, respectively.

As stated in claim 6, said second control and/or monitor signals may e.g. be transferred in the fibre as optical signals having a wavelength which is different from the wavelength of said data signals and first control and/or monitor signals. This ensures that the signals do not interfere with the other optical signals in the fibre, and it is a simple operation to separate the signals from the other signals on the receiver side.

Alternatively, said second control and/or monitor signals may be transferred in the fibre by modulation of a carrier wave, which is also used for the transfer of said data signals and first control and/or monitor signals. This method requires a little more complex equipment; but, on the other hand, it does not occupy additional bandwidth in the fibre, which is of importance particularly in networks of much traffic where it is desired to have a bandwidth as large as possible at disposal for the data traffic proper.

As stated in claim 8, the method may be used particularly in a data transmission network which is designed as a Synchronous Digital Hierarchy (SDH), and said second control and/or monitor signals may then be formed on the basis of one or more of the overhead bytes used in SDH. Preferably, one or more of the overhead bytes marked D1–D12 may be used, as stated in claim 9.

As mentioned, the invention also concerns an amplifier unit having an optical fibre amplifier and adapted to be inserted in an optical fibre between two network elements in a digital data transmission network, as described above.

When the unit is adapted to transmit/receive second control and/or overhead signals in a format corresponding to said overhead signals, then, as mentioned before, the signals in the adjacent network elements may be incorporated directly in the general monitoring system in quite the same manner as if it had been traditional electrical regenerators.

An expedient embodiment of the amplifier unit, which is defined in claim 11, is adapted to receive and/or transmit said second control and/or monitor signals via the optical fibre in which the optical fibre amplifier is inserted.

Likewise, as stated in claim 12, the amplifier unit may be adapted to be used in a data transmission network designed as a Synchronous Digital Hierarchy (SDH), and to allow said second control and/or monitor signals to be formed on the basis of one or more of he overhead bytes used in SDH. In particular, as stated in claim 13, it may preferably be adapted to use one or more of the overhead bytes marked D1–D12.

When, as stated in claim 14, the amplifier unit comprises a local control unit which is adapted to generate said second control and/or monitor signals on the basis of the state of the optical fibre amplifier, and/or to control the optical amplifier on the basis of received said second control and/or monitor signals, it is ensured that the amplifier unit may be viewed externally in quite the same manner as a traditional electrical regenerator.

As stated in claim 15, the amplifier unit may e.g. comprise means to separate light having a specific wavelength length from the optical signal received via said fibre, and to convert the separated light into said second control and/or monitor signals. Alternatively, as stated in claim 16, it may comprise means to demodulate signals which are modulated on the optical signal received from said fibre, and to convert these into said second control and/or monitor signals.

Correspondingly, as stated in claim 17, the amplifier unit may e.g. comprise means to convert said second control and/or monitor signals into an optical signal having a wavelength which is different from wavelengths occurring in the optical signals amplified by the optical fibre amplifier, and means to multiplex said optical signal with the amplified optical signals. Alternatively, as stated in claim 18, it may comprise means to modulate said second control and/or monitor signals on the optical signals amplified by the optical fibre amplifier. In the latter case, the modulating means may expediently be adapted to modulate a pump laser current to the optical fibre amplifier, as stated in claim 19.

The advantages of separate wavelength and modulation, respectively, are described above.

Figure 2:
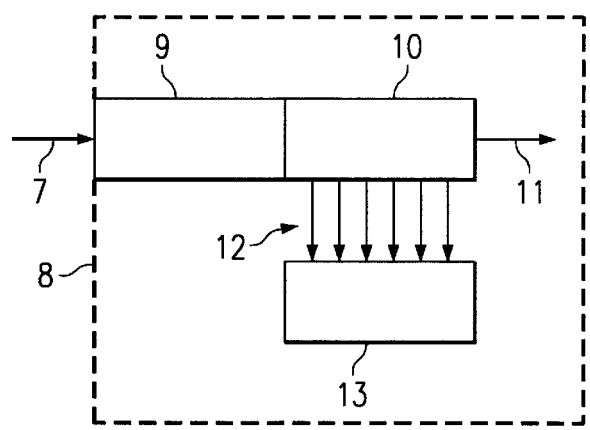
Figure 3:
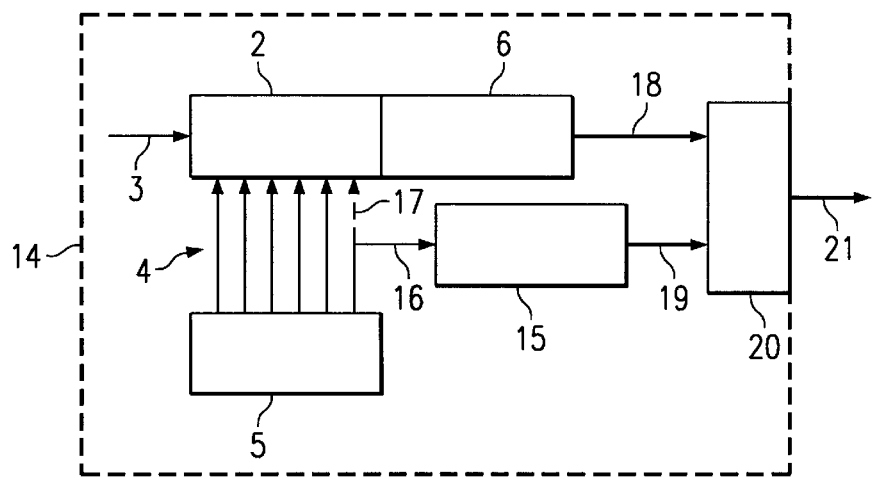
Figure 4:
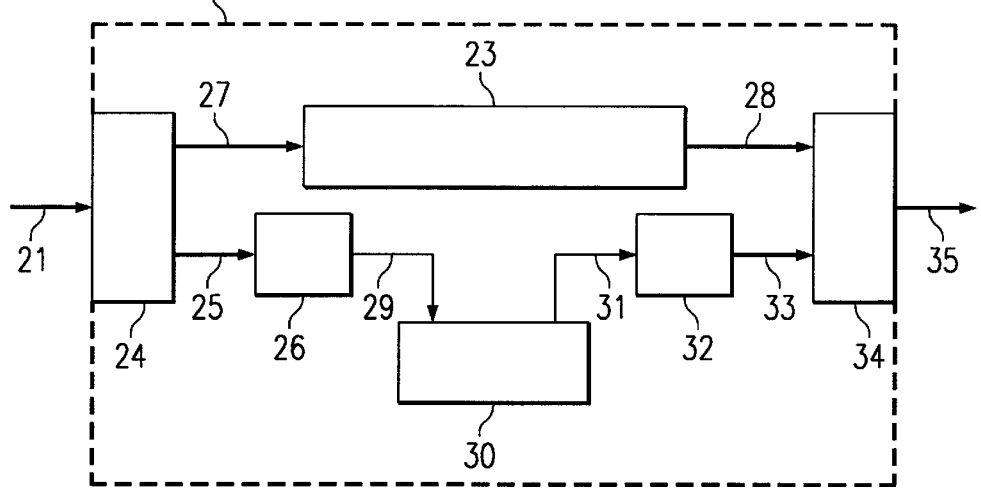
Figure 5:
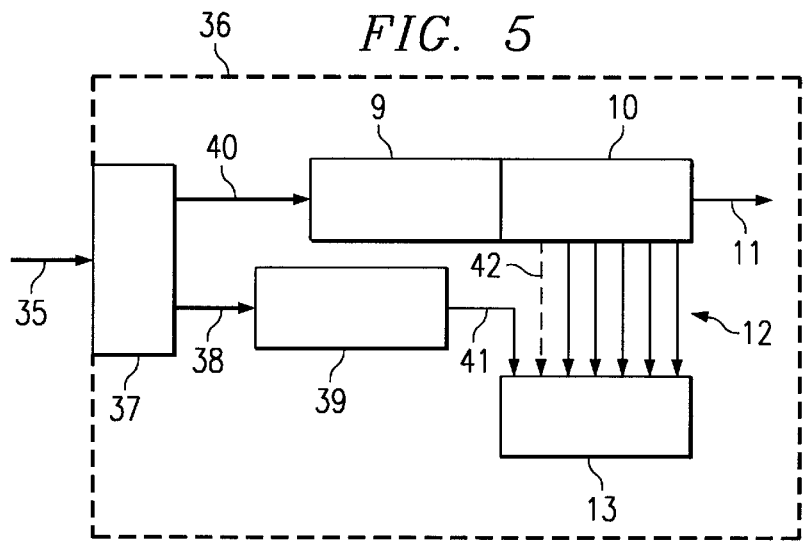
Figure 6:
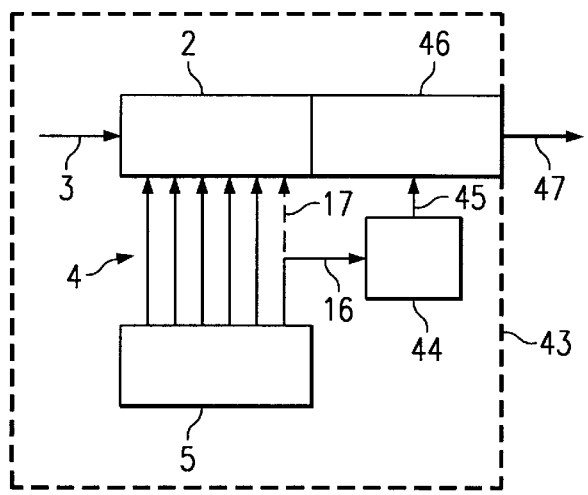

The invention will be explained more fully below with reference to the drawing, in which FIG. 1 shows an output part of a known network element, FIG. 2 shows an input part of a known network element, FIG. 3 shows an output part of a network element according to a first embodiment of the invention, FIG. 4 shows an optical amplifier unit according to a first embodiment of the invention, FIG. 5 shows an input part of a network element according to a first embodiment of the invention, FIG. 6 shows an output part of a network element according to a second embodiment of the invention, FIG. 7 shows an optical amplifier unit according to a second embodiment of the invention, FIG. 8 shows an input part of a network element according to a second embodiment of the invention, and FIG. 9 shows a third embodiment of the invention.

FIG. 1 shows the output part 1 of a traditional and known network element (such as e.g. a terminal multiplexer) for a teletransmission system of the type in which the invention may be applied. The output part 1 can convert data signals 3 into optical signals 7 and transmit them via an optical fibre to an adjacent network element. A control unit 5 generates a plurality of control and/or monitor signals 4 which, together with the data signals, are transferred to the adjacent network element. These signals are used i.a. for monitoring the function of the network elements. The control and monitor signals 4 are interleaved, as overhead signals, with the data signals 3 in the electrical multiplexer 2, and they are then converted in the optical transmitter unit 6 into the optical signals 7 which are transferred via the fibre to the adjacent network element. The nature of this interleaving depends on the employed transmission protocol, which determines strict formats therefor. An example will be described below.

For clarity, optical signals are shown as arrows in a thick black line in FIG. 1 and the following figures, while arrows of ordinary line thickness represent electrical signals.

FIG. 2 similarly shows the input part 8 of an adjacent network element. Here, the optical signals 7, which arrive via the optical fibre from the output part shown in FIG. 1, are received in the optical receiver unit 9, in which they are converted into electrical signals which are split in the demultiplexer 10 into the data signals 11 and the control and monitor signals 12 for the control unit 3. The data signals 11 correspond to the data signals 3 in FIG. 1, and the control and monitor signals 12 correspond to the signals 4.

In the situation shown in FIGS. 1 and 2, the optical signals are transmitted via an optical fibre from the output part 1 in one network element to the input part 8 in another network element, which means that the optical fibre transfers light in one direction only. This will also frequently be the case in practice, as signals in the opposite direction can then be transmitted via a second fibre which is arranged in parallel with the first one. However, it should be noted that, of course, it is possible to use the same fibre for the transmission of optical signals in both directions. In that case, the fibre will be connected at both ends to a combined input/output part capable of both transmitting and receiving optical signals and keeping these mutually separate. The mode of operation will be the same as described above.

Said network elements will normally be incorporated in a larger teletransmission network, and the optical signals between the individual network elements may e.g. be transmitted in the fibre by means of a digital transmission system of the SDH (Synchronous Digital Hierarchy) type. The SDH system has channels incorporated in its data structure to control and monitor the network and the individual network elements. The data channels to operate and maintain the network are embedded in the actual SDH signals and are therefore accessible in the SDH network elements in which the signals are "packed out".

The basic data structure of an SDH system is an STM-1 frame which consists of 9 rows having 270 bytes each. Of these, the first 9 bytes in each row of the system are used for said data channels to control and monitor the network, and they are also called overhead information. Three of these bytes (D1–D3) are used for controlling and monitoring regenerators on an SDH line, while 9 other bytes (D4–D12) are similarly used for controlling and monitoring multiplexers on an SDH line.

The control and monitor signals 4 and 12 shown in FIGS. 1 and 2 will be formed i.a. by said bytes D1–D12 in an SDH system, the control unit 5 calculating the bytes concerned and transmitting them, as described above, via the optical fibre to the control unit 13 of the receiver.

If one or more optical fibre amplifiers are inserted in the optical fibre which transfers the optical signals between e.g. two terminal multiplexers, the optical signals i.e. also the overhead signals, will pass unchanged from one terminal multiplexer through the fibre amplifiers to the other terminal multiplexer. Thus, it is not possible to add or remove overhead signals in the fibre amplifiers, as these just purely optically amplify the light which passes them.

However, it is also expedient to be able to monitor the fibre amplifiers, and the invention therefore teaches how to do this by means of special optical signals which are transferred to and from the fibre amplifier. FIG. 3 thus shows an output part 14, modified according to the invention, for e.g. a terminal multiplexer which, in addition to the components shown in FIG. 1, has a further optical transmitter unit 15 and an optical multiplexer 20. The control and monitor signals 4 generated in the control unit 5 are fed to the multiplexer 2 like before, in which they are interleaved with the data signals 3 and are converted in the optical transmitter unit 6 into optical signals 18 corresponding to the optical signals 7 in FIG. 1. Some control and monitor signals 16, which may be the above-mentioned bytes D1–D12 in an SDH system and which are to be transferred to the fibre amplifier, are moreover fed to the further optical transmitter unit 15, in which they are converted into optical signals 19 having another wavelength than the optical signals 18. If the optical signals 18 already consist of light having several different wavelengths, the optical signals 19 will have a wavelength which is not included in the signals 18.

In the optical wavelength multiplexer 20, the optical signals 18 and 19 are mixed to form the optical signal 21 which is then transmitted on the optical fibre. The multiplexer 20 may be a simple optical component which merely adds up the signals 18 and 19.

As appears from the dashed arrow 17, the control signals (D1–D12) concerned may be fed to the multiplexer 2 as well as the transmitter unit 15, as described above, or they may be fed just to the transmitter unit 15. The two situations will be described later.

FIG. 4 shows how an optical amplifier unit 22 having a fibre amplifier 23 and associated control circuits may be built. The optical signal 21 from the optical fibre first passes the wavelength demultiplexer 24, which splits it so that light having a wavelength corresponding to the wavelength of the optical signal 19 in FIG. 3 is fed as the optical signal 25 to an optical receiver unit 26, while other wavelengths are fed as the optical signal 27 directly to the actual optical fibre amplifier 23 which amplifies the signal purely optically. Thus, the optical signal 28 on the output of the fibre amplifier 23 is just an amplified version of the signal 27. The branched optical signal 25 is converted in the receiver unit 26 into an electrical control and monitor signal 29, which corresponds to the signal 16 in FIG. 3 and may thus be formed by said bytes D1–D12 in an SDH system. This signal is fed to a local control unit 30 where it may form part of the control of the fibre amplifier.

It is thus possible to transfer control and monitor signals in the described manner from a traditional network element to an optical fibre amplifier together with the optical data signals which, apart from the amplification, pass the amplifier unchanged. In a quite similar manner, control and monitor signals may be transferred from the fibre amplifier to a subsequent traditional network element, and this is described below.

The control unit 30 applies control and monitor signals 31, which may also be formed by bytes corresponding to D1–D12, quite as if a traditional regenerator was involved. The signals 31 are converted in the optical transmitter unit 32 into an optical signal 33. If the demultiplexer 24 has removed at any rate the greater part of light having the wavelength of the signals 19 and 25 from the optical signal 27, only a small part of this wavelength remains in the signal 28, and this wavelength may thus be used again for the optical signal 33. Otherwise, a new wavelength must be used. The optical signals 28 and 33 are mixed in an optical multiplexer 34 to form the optical signal 35 in the same manner as has already been described for FIG. 3, said signal 35 being transmitmitted on the fibre which leads to the receiver part of a traditional network element or optionally to another optical fibre amplifier.

FIG. 5 shows the modified input part 36 of an otherwise traditional network element. Here, too, the optical signals 35 from the fibre first passes an optical demultiplexier 37, which splits it so that light having a wavelength length corresponding to the wavelength of the optical signal 33 in FIG. 4 is fed as the optical signal 38 to an optical receiver unit 39, while other wavelengths are fed as the optical signal 40 to the optical receiver unit 9, in which it is converted into electrical signals, which are split in the demultiplexer 10 into the data signals 11 and the control and monitor signals 12 for the control unit 13, as was described above for FIG. 2.

The optical signal 38 is converted in the optical receiver unit 39 into electrical control and monitor signals 41, e.g. in the form of the previously described bytes D1–D12 which are fed to the control unit 13, which is now also capable of receiving such signals from an inserted fibre amplifier.

It should be noted that if, as shown in FIG. 3, the D1–D12 signals for this network element has been fed as the signals 16 and 17 to the optical transmitter unit 15 and the Multiplexer 2, respectively, the D1–D12 bytes originating from this will still be present in the signal which is demultiplexed in the demultiplexer 10, and they may then be fed as the signals 42 to the control unit 13. This will thus be capable of receiving D1–D12 bytes from the preceding traditional network element as well as from an inserted optical fibre amplifier.

An alternative embodiment of the invention is shown in FIGS. 6–8. In the embodiment described above, the control and monitor signals are transferred to and from the optical amplifier by means of light having another wavelength than the one or ones used for the other data signals. In FIGS. 6–8, the control and monitor signals are transferred instead by modulating the already occurring wavelength.

The output part 43 shown in FIG. 6 for a terminal multiplexer corresponds to the output part 14 in FIG. 3, but is modified in a number of respects. The control and monitor signals 16, which may be the above-mentioned bytes D1–D12 in an SDH system, as mentioned, and which are to be transferred to the fibre amplifier, are now fed to a modulation circuit 44 instead, in which they are converted into a modulation signal 45. In the optical transmitter unit 46 in which the electrical signals are converted into optical signals 47, as described before, the modulation signal 45 is used for modulating these optical signals. This may take place e.g. by amplitude modulation, and the principle is also called subcarrier multiplexing.

FIG. 7 correspondingly shows a modified optical amplifier unit 48. Here, the modulated optical signal 47 first passes an optical power divider 49, in which it is split into two optical signals 50 and 51, both of which correspond to the signal 47, but are just weaker. Typically, the power division takes place such that most of the power is fed to the signal 50, which is the signal proper, while the signal 51 just constitutes a small part of the power, since this is merely to be used for demodulating the modulated control signals. This takes place in the demodulation unit 52, which recreates the electrical control and monitor signal 29, which, like before, corresponds to the signal 16 in FIG. 6 and is fed to the local control unit 30. The optical signal 50 is fed directly to the optical fibre amplifier 23 itself, which amplifies the signal purely optically, like before.

The control and monitor signals 31 which are emitted by the control unit 30 and are to be transferred to a subsequent traditional network element, are here fed to a modulation circuit 53 in which they are converted into a modulation signal 54. The modulation signal 54 is used for modulating the gain of the optical fibre amplifier in which the optical signals 50 are amplified, so that the control and monitor signals are modulated on the optical output signal 55 in the same manner as for the signal 47 in FIG. 6. The modulation in the fibre amplifier may take place by modulating the pump laser current.

FIG. 8 shows an example of an input part 56 of a traditional network element corresponding thereto. The optical signal 55 is received here in the optical receiver unit 57, in which it is converted into an electrical signal which, on one hand, is further processed in the demultiplexer 10, like before, and, on the other hand, is fed as the signal 58 to the demodulation circuit 59. The demodulation that takes place in this circuit, creates the control and monitor signals 51, which have been described before. Alternatively, the same principle may be used in the input part as in the amplifier unit in FIG. 7, where the optical signal is split in an optical power divider into two signals, which are then processed separately. However, this solution is less expedient here, as it results in a power loss for the optical signal.

The non-mentioned parts of FIGS. 6–8 are unchanged and have the same function in relation to FIGS. 3–5.

Finally, FIG. 9 shows a third embodiment using separate fibres for transferring the control and monitor signals to and from the optical fibre amplifier. The constituent components are the same as in FIGS. 3–5. The optical signals 18 and 19 are here transmitted from the output part 61 on their respective fibres to the fibre amplifier 62 instead of being mixed to form a single signal 21 in the optical wavelength multiplexer 20 like before. Therefore, the amplifier unit 62 receives the two signals independently of each other from their respective fibres, and the wavelength demultiplexer 24 from FIG. 4 may thus be omitted. Similarly, the optical signals 28 and 33 are transmitted on their respective fibres from the amplifier unit 62 to the input part 63. Otherwise, the circuits operate as described before.

A variant of this embodiment occurs where e.g. a fibre connection uses a cable having several fibres into each of which fibre amplifiers may be inserted en route. Thus, an amplifier unit may contain a fibre amplifier for each fibre. In this situation, it may be expedient that the control and monitor signals from all the fibre amplifiers in an amplifier unit are transferred on one and the same fibre, which may either be a separate fibre for this purpose or one of the other fibres, it being possible to multiplex the signals into the fibre together with its other signals by means of the one of the methods described above.

Although a preferred embodiment of the present invention has been described and illustrated, the invention is not restricted to this, but may also be embodied in other ways within the scope of the subject-matter defined in the following claims.

What is claimed is:

1. A method of transmitting data signals via an optical-fibre between two network elements in a digital data transmission network according to a transmission protocol, wherein, in addition to said data signals, first control and/or monitor signals in the form of overhead signals are transmitted between the two network elements in a format determined by the transmission protocol, and wherein an optical fibre amplifier is inserted in the optical fibre between the two network elements, and second control and/or monitor signals are additionally transferred between the optical fibre amplifier and at least one of the two network elements, characterized in that said second control and/or monitor signals are transferred to or from the optical fibre amplifier as one or more bytes, whose information content has the same format as said overhead signals.

2. A method according to claim 1, characterized by transferring said second control and/or monitor signals between the optical fibre amplifier and said network element via an optical fibre.

3. A method according to claim 2, characterized by transferring said second control and/or monitor signals via the optical fibre in which the optical fibre amplifier is inserted.

4. A method according to claim 2, characterized by transferring said second control and/or monitor signals without changing said data signals and first control and/or monitor signals.

5. A method according to claim 2, characterized by transferring said second control and/or monitor signals by means of special optical transmitter/receiver units placed at the optical line amplifier and said network element, respectively.

6. A method according to claim 2, characterized by transferring said second control and/or monitor signals in the fibre as optical signals having a wavelength which is different from the wavelength of said data signals and first control and/or monitor signals.

7. A method according to claim 2, characterized by transferring said second control and/or monitor signals in the fibre by modulation of a carrier wave, which is also used for transferring said data signals and first control and/or monitor signals.

8. A method according to claim 1, characterized in that the data transmission network is designed as a Synchronous Digital Hierarchy (SDH), and that said second control and/or monitor signals are formed on the basis of one or more of the overhead bytes used in SDH.

9. A method according to claim 8, characterized by preferably using one or more of the overhead bytes marked D1–D12.

10. An amplifier unit comprising an optical fibre amplifier and adapted to be inserted in an optical fibre for the transmission of data signals between two network elements in a digital data transmission network according to a transmission protocol, wherein, in addition to said data signals, first control and/or monitor signals in the form of overhead signals are transmitted, between the two network elements in a format determined by the transmission protocol and wherein the unit moreover comprises means to transmit and/or receive second control and/or monitor signals between the unit and at least one of the two network elements, characterized in that the unit is adapted to transmit and/or receive said second control and/or monitor signals as one or more bytes, whose information content has the same format as said overhead signals.

11. An amplifier unit according to claim 10, characterized in that it is adapted to receive and/or transmit said second control and/or monitor signals via the optical fibre in which the optical fibre amplifier is inserted.

12. An amplifier unit according to claim 10, characterized in that it comprises means to separate light having a specific wavelength from the optical signal received via said fibre, and means to convert the separated light into said second control and/or monitor signals.

13. An amplifier unit according to claim 11, characterized in that it comprises means to demodulate signals which are modulated on the optical signal received from said fibre, and to convert these into said second control and/or monitor signals.

14. An amplifier unit according to claim 11, characterized in that it comprises means to convert said second control and/or monitor signals into an optical signal having a wavelength which is different from wavelengths occurring in the optical signals amplified by the optical fibre amplifier, and means to multiplex said optical signal with the amplified optical signals.

15. An amplifier unit according to claim 11, characterized in that it comprises means to modulate said second control and/or monitor signals on the optical signals amplified by the optical fibre amplifier.

16. An amplifier unit according to claim 15, characterized in that said modulating means are adapted to modulate a pump laser current to the optical fibre amplifier.

17. An amplifier unit according to claim 10, characterized in that it is adapted to be used in a data transmission network designed as a Synchronous Digital Hierarchy (SDH), and to enable said second control and/or monitor signals to be formed on the basis of one or more of the overhead bytes used in SDH.

18. An amplifier unit according to claim 17, characterized in that it is preferably adapted to use one or more of the overhead bytes marked D1–D12.

19. An amplifier unit according to claim 10, characterized in that it comprises a local control unit which is adapted to generate said second control and/or monitor signals on the basis of the state of the optical fibre amplifier, and/or to control the optical fibre amplifier on the basis of received said second control and/or monitor signals.

* * * * *

UNITED STATES PATENT AND TRADEMARK OFFICE
CERTIFICATE OF CORRECTION

PATENT NO. : 6,285,480 B1
DATED : September 4, 2001
INVENTOR(S) : Henrik Horlyck It is certified that error appears in the above-identified patent and that said Letters Patent is hereby corrected as shown below:

Column 3,
Line 3, after "of", delete "he", and insert -- the --.
Line 62, after "used", delete "i.a.", and insert -- i.e. --.

Column 4,
Line 52, after "formed", delete "i.a.", and insert -- i.e. --.

Column 5,
Line 65, after "being", delete "tramsmitmitted.", and insert -- transmitted --.

Column 6,
Line 15, after "unit", delete "13", and insert -- 13 --.
Line 20, after "the", delete "Multiplexer", and insert -- multiplexer --.
Line 33, after "occurring", delete "wavelength", and insert -- wavelengths --.

Signed and Sealed this

Nineteenth Day of March, 2002

*Attest:*

JAMES E. ROGAN
*Attesting Officer*   *Director of the United States Patent and Trademark Office*